(12) United States Patent
Lee et al.

(10) Patent No.: US 9,837,648 B2
(45) Date of Patent: Dec. 5, 2017

(54) RECHARGEABLE BATTERY

(71) Applicant: SAMSUNG SDI CO., LTD., Yongin-si, Gyeonggi-do (KR)

(72) Inventors: Chi-Young Lee, Yongin-si (KR); Myung-Jae Jang, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 170 days.

(21) Appl. No.: 14/829,557

(22) Filed: Aug. 18, 2015

(65) Prior Publication Data

US 2016/0254508 A1    Sep. 1, 2016

(30) Foreign Application Priority Data

Feb. 27, 2015    (KR) .................. 10-2015-0028565

(51) Int. Cl.
*H01M 2/12* (2006.01)
*H01M 2/34* (2006.01)
(Continued)

(52) U.S. Cl.
CPC ........... *H01M 2/1241* (2013.01); *H01M 2/02* (2013.01); *H01M 2/0202* (2013.01);
(Continued)

(58) Field of Classification Search
CPC ......... H01M 10/0525; H01M 2220/20; H01M 2220/30; H01M 2/02; H01M 2/0202;
(Continued)

(56) References Cited

U.S. PATENT DOCUMENTS 5,741,606 A     4/1998   Mayer et al.
2004/0241536 A1  12/2004  Kim
(Continued)

FOREIGN PATENT DOCUMENTS

EP      0840382 A1   5/1998
EP      2309569 A1   4/2011
(Continued)

OTHER PUBLICATIONS

EPO Extended Search Report dated Jun. 2, 2016, for corresponding European Patent Application No. 15199146.0 ( 7 pages).
(Continued)

*Primary Examiner* — Patrick Ryan
*Assistant Examiner* — Ben Lewis
(74) *Attorney, Agent, or Firm* — Lewis Roca Rothgerber Christie LLP

(57) ABSTRACT

A rechargeable battery includes: an electrode assembly having a first electrode and a second electrode; an electrode terminal electrically connected to the electrode assembly; a case that receives the electrode assembly; a cap plate at an opening of the case, the cap plate closing and sealing the case and having a vent hole configured to discharge an internal pressure of the case; and a vent module including a vent portion, the vent portion including a buffer portion configured to buffer an impact that is transferred to the vent hole, and a fracture portion that closes and seals the vent hole, wherein the fracture portion is configured to be fractured by the internal pressure.

4 Claims, 9 Drawing Sheets

(51) Int. Cl.
*H01M 2/02* (2006.01)
*H01M 2/04* (2006.01)
*H01M 2/30* (2006.01)
*H01M 10/0525* (2010.01)

(52) U.S. Cl.
CPC .......... *H01M 2/0237* (2013.01); *H01M 2/04* (2013.01); *H01M 2/043* (2013.01); *H01M 2/0404* (2013.01); *H01M 2/1223* (2013.01); *H01M 2/1229* (2013.01); *H01M 2/1235* (2013.01); *H01M 2/30* (2013.01); *H01M 2/345* (2013.01); *H01M 10/0525* (2013.01); *H01M 2220/20* (2013.01); *H01M 2220/30* (2013.01)

(58) Field of Classification Search
CPC .... H01M 2/0237; H01M 2/04; H01M 2/0404; H01M 2/043; H01M 2/1223; H01M 2/1229; H01M 2/1235; H01M 2/1241; H01M 2/30; H01M 2/345
See application file for complete search history.

(56) References Cited

U.S. PATENT DOCUMENTS

| | | | |
|---|---|---|---|
| 2006/0257733 A1* | 11/2006 | Kim | H01M 2/0486 429/185 |
| 2010/0279156 A1 | 11/2010 | Kim et al. | |
| 2012/0040214 A1* | 2/2012 | Kim | H01M 2/1241 429/56 |
| 2014/0199567 A1 | 7/2014 | Kim | |

FOREIGN PATENT DOCUMENTS

| KR | 10-2007-0071232 A | 7/2007 |
|---|---|---|
| KR | 10-1390527 B1 | 4/2014 |

OTHER PUBLICATIONS

Korean Patent Abstracts Publication No. 10-2011-0030043 A, dated Mar. 23, 2011, for KR 10-1390527 B1, 1 page.

* cited by examiner

32

RECHARGEABLE BATTERY

CROSS-REFERENCE TO RELATED APPLICATION

This application claims priority to and the benefit of Korean Patent Application No. 10-2015-0028565 filed in the Korean Intellectual Property Office on Feb. 27, 2015, the entire contents of which are incorporated herein by reference.

BACKGROUND

1. Field of the Invention

The present invention relates to a rechargeable battery.

2. Description of the Related Art

A rechargeable battery can be repeatedly charged and discharged, unlike a primary battery that is not designed to be recharged. A rechargeable battery having a small capacity is used for a small portable electronic device like a mobile phone or a laptop computer and a camcorder, and a rechargeable battery having a large capacity is widely used as a power source for driving a motor of a hybrid vehicle.

A nickel-cadmium (Ni—Cd) battery, a nickel-metal hydride (Ni-MH) battery, a lithium (Li) battery, and a lithium ion (Li-ion) rechargeable battery are each available rechargeable batteries. Particularly, the Li-ion rechargeable battery has an operation voltage that is about 3 times greater than the operation voltage of a Ni—Cd battery and of a Ni-MH battery, which are all widely used as a portable electronic equipment power source. Further, due to a high energy density per unit weight, the Li-ion rechargeable battery is widely used.

The rechargeable battery generally uses a lithium-based oxide as a positive electrode active material and a carbon material as a negative electrode active material. In general, the rechargeable battery is classified into a liquid electrolyte battery and a polymer electrolyte battery according to a type of electrolyte used. A battery using a liquid electrolyte is referred to as a Li-ion battery, and a battery using a polymer electrolyte is referred to as a lithium polymer battery.

For instances when an internal pressure exceeds a predetermined pressure, a rechargeable battery includes a vent hole that discharges the internal pressure and a vent plate that closes and seals the vent hole. When an internal pressure of the rechargeable battery exceeds a predetermined pressure, the vent plate is cut out to open the vent hole.

However, when an impact is applied from the outside of the rechargeable battery, the vent plate may be abnormally fractured regardless of an internal pressure of the rechargeable battery.

The above information disclosed in this Background section is only for enhancement of understanding of the background of the invention and therefore it may contain information that does not form prior art.

SUMMARY

The present invention provides a rechargeable battery that may prevent or substantially prevent a vent hole from being abnormally opened by an external impact.

One or more exemplary embodiments of the present invention provide a rechargeable battery including: an electrode assembly having a first electrode and a second electrode; an electrode terminal electrically connected to the electrode assembly; a case that receives the electrode assembly; a cap plate at an opening of the case, the cap plate closing and sealing the case and having a vent hole configured to discharge an internal pressure of the case; and a vent module including a vent portion, the vent portion including a buffer portion that buffers an impact that is transferred to the vent hole, and a fracture portion that closes and seals the vent hole, wherein the fracture portion is configured to be fractured by the internal pressure.

The vent module may include a fixing portion fixed at an inner wall surface of the vent hole and connected to the vent portion.

The inner wall surface of the vent hole may have an insertion groove that receives the fixing portion.

The fixing portion may be welded to the vent hole.

The fracture portion and the buffer portion may alternate with each other.

The vent portion may include two or more fracture portions, each fracture portion having a thickness that is less than a thickness of the buffer portion.

The fracture portion may be located at or below a central region of the fixing portion.

The buffer portion may protrude in a round shape between the fracture portions and the thickness of the buffer portion may be less than a thickness of the fixing portion.

According to one or more exemplary embodiments of the present invention, a vent portion that closes and seals a vent hole may include a fracture portion and a buffer portion that are alternately formed. Thus, when an impact is transferred to the vent portion from the outside of the rechargeable battery, the buffer portion may prevent or substantially prevent the vent hole from abnormally opening.

According to one or more exemplary embodiments of the present invention, a rechargeable battery includes two or more fracture portions that may fracture when an internal pressure of the rechargeable battery reaches a predetermined pressure. Thus, an abnormal internal pressure of the rechargeable battery can be stably or substantially stably discharged to the outside.

DETAILED DESCRIPTION

Figure 1:
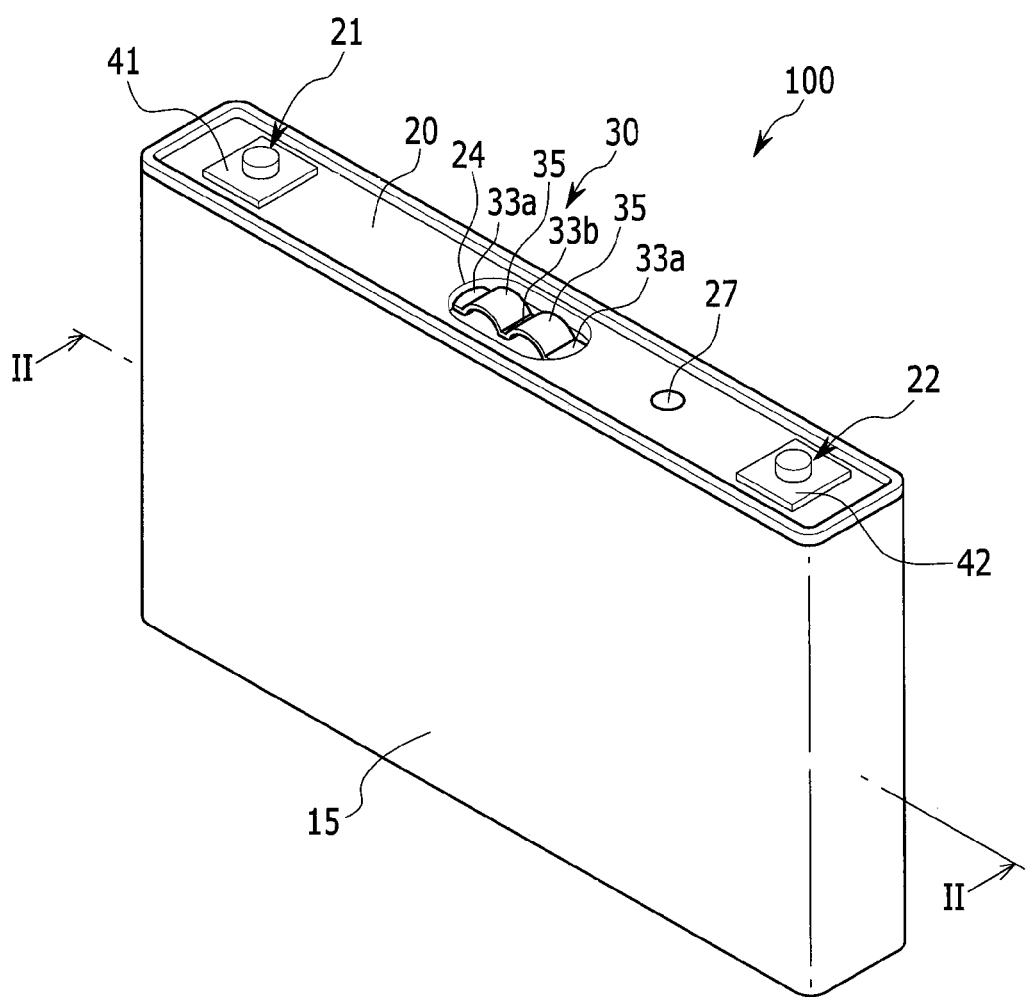
FIG. 1 is a perspective view of a rechargeable battery according to one or more exemplary embodiments of the present invention.

The present invention is described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that although the terms "first," "second," etc. may be used herein to describe various components, these components should not be limited by these terms. These components are only used to distinguish one component from another. As used herein, the singular forms "a," and "an" are intended to include the plural forms as well, unless the context clearly indicates otherwise. It will be further understood that the terms "comprises," "comprising," "includes," and/or "including" used herein specify the presence of stated features or components, but do not preclude the presence or addition of one or more other features or components. The use of "may" when describing embodiments of the present invention refers to "one or more embodiments of the present invention." Also, the term "exemplary" is intended to refer to an example or illustration.

Sizes of elements in the drawings may be exaggerated for convenience of explanation. In other words, because sizes and thicknesses of components in the drawings are arbitrarily illustrated for convenience of explanation, the following embodiments are not limited thereto. Spatially relative terms, such as "below," "lower," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" other elements or features would then be oriented "above" the other elements or features. Thus, the example term "below" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "coupled to" or "connected to" another element or layer, it can be directly on or directly coupled to or directly connect to the other element or layer, or one or more intervening elements or layers may also be present. In addition, it will also be understood that when an element or layer is referred to as being "between" two elements or layers, it can be the only element or layer between the two elements or layers, or one or more intervening elements or layers may also be present.

Figure 2:
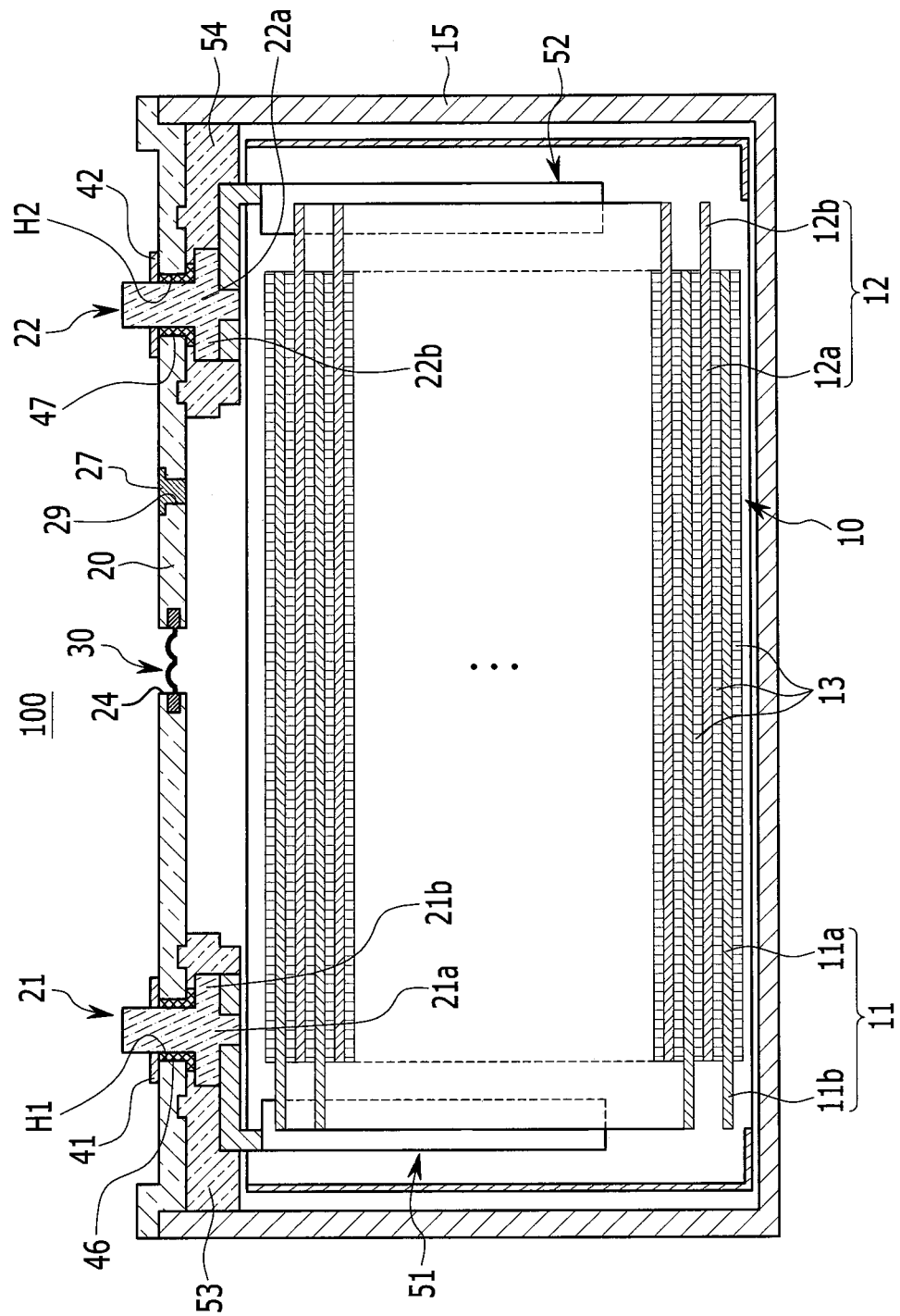
FIG. 2 is a cross-sectional view of the rechargeable battery of FIG. 1 taken along the line II-II.

FIG. 1 is a perspective view of a rechargeable battery according to one or more exemplary embodiments of the present invention, and FIG. 2 is a cross-sectional view of the rechargeable battery of FIG. 1 taken along the line II-II.

As shown in FIGS. 1 and 2, a rechargeable battery 100 according to one or more exemplary embodiments of the present invention includes an electrode assembly 10 having a first electrode 11 and a second electrode 12, electrode terminals 21 and 22 that are electrically connected to the electrode assembly 10, a case 15 that receives the electrode assembly 10, a cap plate 20 having a vent hole 24, and a vent module 30. The cap plate 20 closes an opening of the case 15 and seals the case 15. The vent hole 24 discharges an internal pressure of the case 15. The vent module 30 includes a fracture portion 33 that closes and seals the vent hole 24.

The fracture portion 33 is fractured when the rechargeable battery 100 exceeds a predetermined internal pressure. The vent module 30 also includes a buffer portion 35 that buffers an impact that is transferred to the vent hole 24.

For example, the electrode assembly 10 may be formed by disposing the first electrode (hereinafter referred to as a "negative electrode") 11 and the second electrode (hereinafter referred to as a "positive electrode") 12 at respective surfaces of a separator 13 and by spirally-winding the negative electrode 11, the separator 13, and the positive electrode 12 in a jelly roll state. The separator 13 may be an insulator.

The negative electrode 11 and the positive electrode 12 respectively include coated regions 11a and 12a at which an active material is applied to a current collector of a metal plate, and uncoated regions 11b and 12b, respectively, that are formed with an exposed current collector because an active material is not applied thereto.

The uncoated region 11b of the negative electrode 11 is formed at an end portion of one side of the negative electrode 11 along the spiral-wound negative electrode 11. The uncoated region 12b of the positive electrode 12 is formed at an end portion of one side of the positive electrode 12 along the spiral-wound positive electrode 12. As such, the uncoated regions 11b and 12b are disposed at respective ends of the electrode assembly 10.

For example, the case 15 is formed in a generally cuboid shape to provide a space that houses the electrode assembly 10 and an electrolyte solution therein, and forms an opening at one surface of the cuboid. The opening enables the electrode assembly 10 to be inserted into the case 15.

The cap plate 20 is installed in an opening portion of the case 15 to close and seal the case 15. For example, the case 15 and the cap plate 20 are both made of aluminum and may be welded to each other.

The cap plate 20 may have an electrolyte injection opening 29, the vent hole 24, and terminal holes H1 and H2. The electrolyte injection opening 29 enables injection of an electrolyte solution into the case 15. After the electrolyte solution is injected into the case 15, the electrolyte injection opening 29 is sealed by a seal stopper 27.

The vent hole 24 is formed to discharge internal pressure of the rechargeable battery 100. The vent hole 24 is closed and sealed by the vent module 30. That is, when an internal pressure of the rechargeable battery 100 reaches (or, exceeds) a predetermined pressure, the vent module 30 is fractured to open the vent hole 24.

Figure 3:
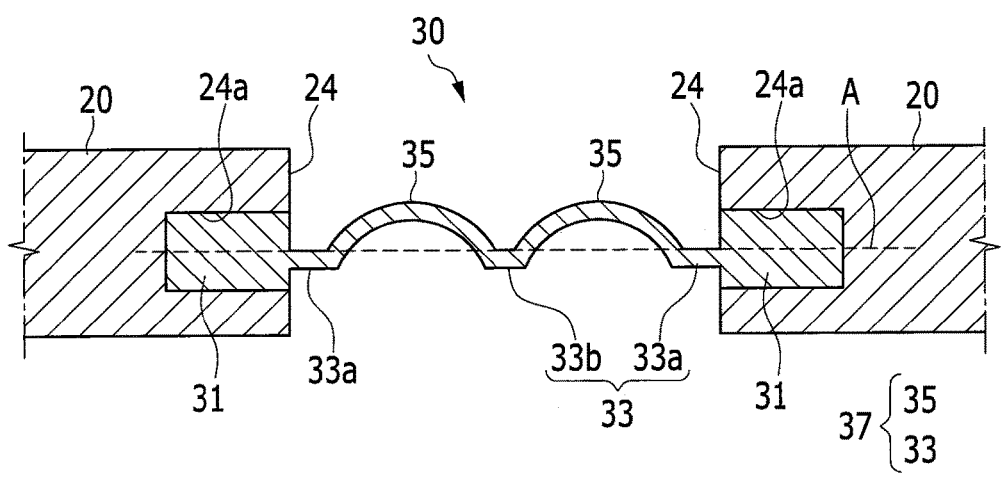
FIG. 3 is a partial cross-sectional view of a vent module according to one or more exemplary embodiments of the present invention.
Figure 4:
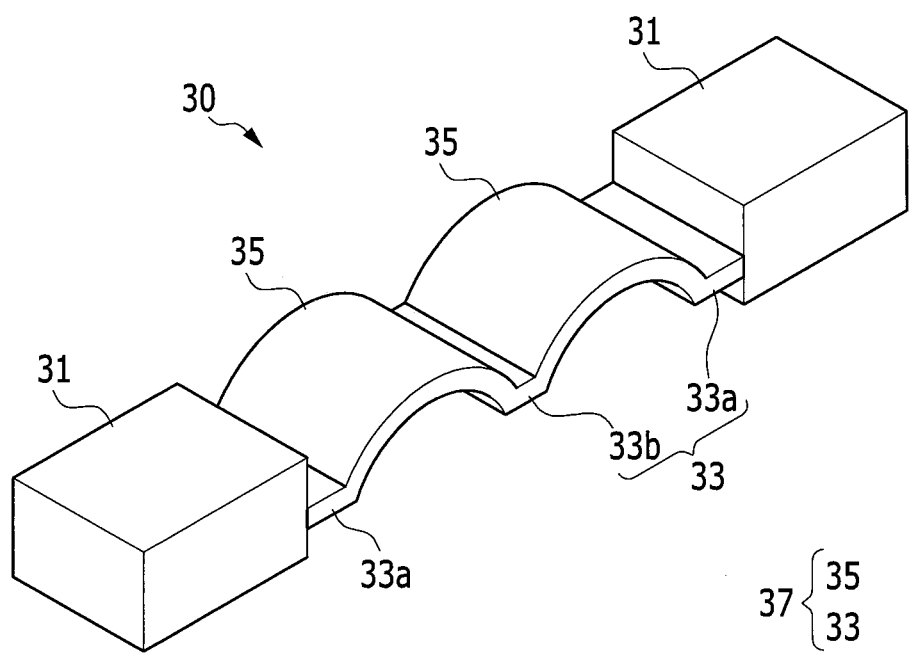
FIG. 4 is a partial perspective view of the vent module of FIG. 3.

FIG. 3 is a partial cross-sectional view of a vent module according to one or more exemplary embodiments of the present invention, and FIG. 4 is a partial perspective view of the vent module of FIG. 3.

As shown in FIGS. 3 and 4, the vent module 30 may include a fixing portion 31 that is fixed to an inner wall surface of the vent hole 24, and a vent portion 37 that is connected to the fixing portion 31. The fracture portion 33 and the buffer portion 35 form the vent portion 37.

The fixing portion 31 fixes the vent module 30 and is fixed to an inner wall surface of the vent hole 24. Insertion grooves 24a may be formed at each inner wall surface of the vent hole 24 so that the vent module 30 may be fixed to the inner wall surfaces of the vent hole 24. Each insertion groove 24a may have any suitable shape, for example the insertion grooves 24a may be formed in a round shape or a polygonal shape to correspond to a shape of the fixing portion 31.

The fixing portions 31 are formed at both sides of the vent module 30 (e.g., at opposite sides of the vent module 30)

with the vent portion 37 interposed therebetween. The fixing portions 31 may be respectively inserted and fixed to the insertion grooves 24a (in other words, the insertion grooves 24a may receive the respective fixing portions 31). The fixing portion 31 may be formed in a polygonal block shape. However, the shape of the fixing portion 31 is not limited thereto, and, for example, may be formed in a round shape.

The fixing portion 31 may be inserted into the insertion groove 24a and fixed to the vent hole 24 by welding. However, the present invention is not limited thereto, and the fixing portion 31 may be fixed to the vent hole 24 by insertion coupling using indentation (e.g., snap fit, press fit, and/or the like).

The vent portion 37 that discharges an internal pressure of the rechargeable battery 100 is connected to the fixing portion 31.

Because both ends of the vent portion 37 are connected to the fixing portion 31, the vent portion 37 closes and seals the vent hole 24. When an internal pressure of the rechargeable battery 100 rises to (or exceeds) a predetermined pressure, the vent portion 37 is fractured to open the vent hole 24.

The vent portion 37, which extends between the fixing portions 31, may have a smaller thickness than a thickness of the fixing portion 31. The fracture portion 33 and the buffer portion 35 may be formed in a length direction of the rechargeable battery 100.

Two or more fracture portions 33 may be formed in the vent portion 37, and the fracture portion 33 may be formed in a notch groove that induces a cut when an internal pressure of the rechargeable battery 100 exceeds a predetermined pressure. In one or more embodiments of the present invention, the fracture portion may have a thickness that is less than a thickness of the buffer portion.

The fracture portion 33 may include two first notch grooves 33a that are each connected to the fixing portion 31, and a second notch groove 33b that is formed between the first notch grooves 33a. When the rechargeable battery 100 operates at an abnormal internal pressure (e.g., when the rechargeable battery 100 exceeds a predetermined internal pressure), the first notch groove 33a and the second notch groove 33b of the fracture portion 33 fracture, thereby opening the vent hole 24 such that the internal pressure of the rechargeable battery 100 may be stably, or substantially stably, discharged to the outside.

The fracture portion 33 may be formed at or below a central region of the fixing portion 31 of the vent module 30 (e.g., may be formed at a lower portion of the vent portion 30 or below a horizontal center-line A of the fixing portions 31). As such, because the fracture portion 33 is formed at or below the central region of the fixing portions 31 (below the center-line A), even if a vibration occurs in the rechargeable battery 100 or an external impact is transferred to the rechargeable battery 100, damage does not occur (or is substantially prevented) in the fracture portion 33, thereby improving or substantially improving durability of the rechargeable battery 100 and of the vent portion 30.

The buffer portion 35 may have a substantially round shape and may protrude in an upward direction and between the fixing portions 31. When an impact or a vibration is transferred from the outside of the rechargeable battery 100 to the vent module 30, the buffer portion 35 may prevent or substantially prevent the impact or the vibration from being directly transferred to the fracture portion 33. Therefore, even if the fracture portion 33 is damaged by the external impact, the vent hole 24 can be prevented or substantially prevented from abnormally opening.

The buffer portion 35 and the fracture portion 33 may be formed to alternate with each other. The vent portion 37 may include two or more buffer portions 35. As such, an impact that is transferred from the outside of the rechargeable battery 100 to the vent module 30 is sequentially buffered by the buffer portions 35 and can therefore prevent or substantially prevent the fracture portions 33 from being damaged by the impact.

As described above, the vent module 30 closes and seals the vent hole 24 and discharges an abnormal internal pressure of the rechargeable battery 100 to the outside, but the vent module 30 is not damaged by an external impact that is transferred from the outside of the rechargeable battery 100 (or the likelihood of damage is reduced or minimized). As such, durability of the rechargeable battery 100 and the vent module 30 can be improved. The vent module 30 according to one or more exemplary embodiments may be formed by press fixing (or press fitting), as described further below with reference to FIGS. 5-8.

Figure 5:
FIG. 5 is a side view of a base of a first process of forming the vent module of FIG. 3.

FIGS. 5-8 illustrate a method of forming a vent module according to one or more embodiments of the present invention. FIG. 5 is a side view illustrating a base of a first process of forming the vent module of FIG. 3. As shown in FIG. 5, in a first process, a base 32 with a rectangular shape is provided.

Figure 6:
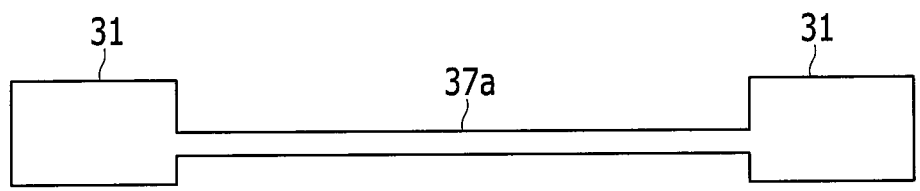
FIG. 6 is a partial side view of a second process of forming the vent module of FIG. 3.

FIG. 6 is a partial side view illustrating a second process of forming the vent module of FIG. 3. As shown in FIG. 6, in a second process, the fixing portions 31 may be formed at both sides of the base 32 by forming a plate portion 37a between the fixing portions 31 by a press process. The plate portion 37a may have a smaller thickness than a thickness of the fixing portions 31.

Figure 7:
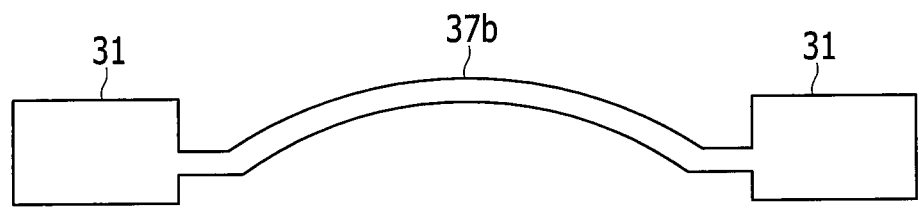
FIG. 7 is a partial side view of a third process of forming the vent module of FIG. 3.

FIG. 7 is a partial side view illustrating a third process of forming the vent module of FIG. 3. As shown in FIG. 7, in the third process, the plate portion 37a is then curved upward to form a rounded portion 37b that protrudes in an upward direction of the fixing portion 31.

Figure 8:
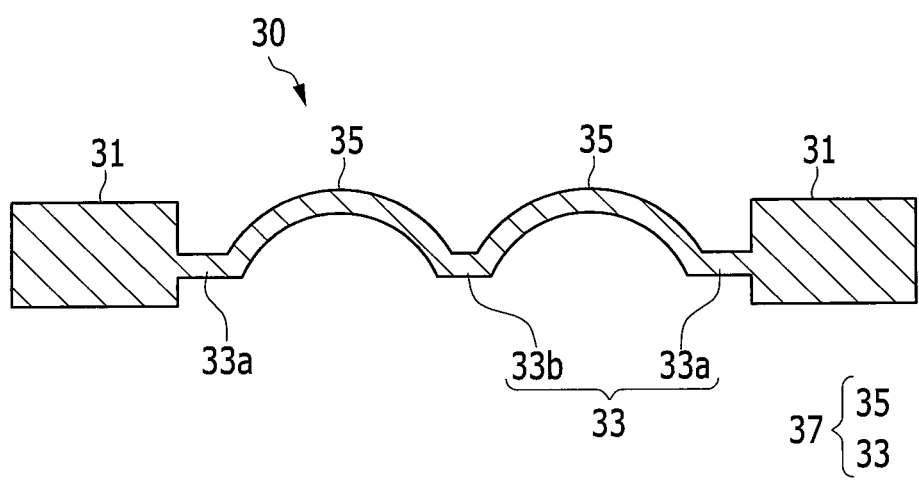
FIG. 8 is a partial side view of a fourth process of forming the vent module of FIG. 3.

FIG. 8 is a partial side view illustrating a fourth process of forming the vent module of FIG. 3. As shown in FIG. 8, the first notch groove 33a, the second notch groove 33b, and the buffer portion 35 are then formed according to a fourth process. That is, a portion of the rounded portion 37b is pressed in a reverse direction (e.g., a downward direction), thereby forming the first notch groove 33a, the second notch groove 33b, and the buffer portion 35.

As described above, the vent module 30 may be formed by a press mold process. As such, the vent module 30 may be formed by a mold process and may be fixed to the cap plate 20 by welding.

The negative electrode terminal 21 and the positive electrode terminal 22 are respectively installed in the terminal holes H1 and H2 of the cap plate 20, and are electrically connected to the electrode assembly 10. That is, the negative electrode terminal 21 is electrically connected to the negative electrode 11 of the electrode assembly 10, and the positive electrode terminal 22 is electrically connected to the positive electrode 12 of the electrode assembly 10. Therefore, the electrode assembly 10 may be drawn out to the outside of the case 15 through the negative electrode terminal 21 and the positive electrode terminal 22.

In one or more exemplary embodiments, the electrode terminals 21 and 22 may respectively include rivet terminals 21a and 22a that are respectively installed in the terminal holes H1 and H2 of the cap plate 20 and that are electrically connected to the electrode assembly 10.

One end of each rivet terminal 21a and 22a is electrically connected to the electrode assembly 10 by welding at the inside of the case 15. The other end of the rivet terminals 21a and 22a may protrude to the outside of the terminal holes H1 and H2, respectively.

A negative electrode gasket 46 and a positive electrode gasket 47 may be installed between the rivet terminals 21a and 22a of the negative electrode terminal 21 and the positive electrode terminal 22 and an inner surface of the terminal holes H1 and H2 of the cap plate 20, respectively, to seal and electrically insulate between the rivet terminals 21a and 22a and the cap plate 20.

The negative electrode terminal 21 and the positive electrode terminal 22 further include a flange 21b and a flange 22b, respectively. The negative electrode gasket 46 and the positive electrode gasket 47 respectively extend between the flanges 21b and 22b and the inside of the cap plate 20 to seal and electrically insulate the flanges 21b and 22b from the cap plate 20. That is, with the negative electrode terminal 21 and the positive electrode terminal 22 installed at the cap plate 20, the negative electrode gasket 46 and the positive electrode gasket 47 respectively prevent or substantially prevent an electrolyte solution from leaking through the terminal holes H1 and H2.

A negative electrode current collecting tab 51 and a positive electrode current collecting tab 52 respectively electrically connect the negative electrode terminal 21 and the positive electrode terminal 22 to the negative electrode 11 and the positive electrode 12 of the electrode assembly 10. That is, by caulking a lower end portion after coupling the negative electrode current collecting tab 51 and the positive electrode current collecting tab 52 to the lower end portion of the rivet terminals 21a and 22a, respectively, while the negative electrode current collecting tab 51 and the positive electrode current collecting tab 52 are supported by the flanges 21b and 22b, respectively, the negative electrode current collecting tab 51 and the positive electrode current collecting tab 52 are connected to a lower end portion of the rivet terminals 21a and 22a.

A lower insulation member 53 is installed between the negative electrode current collecting tab 51 and the cap plate 20 and a lower insulation member 54 is installed between the positive electrode current collecting tab 52 and the cap plate 20 to electrically insulate the negative electrode current collecting tab 51 and the positive electrode current collecting tab 52 and the cap plate 20, respectively. Further, the lower insulation members 53 and 54 are coupled to the cap plate 20 at one side and enclose the negative electrode current collecting tab 51, the positive electrode current collecting tab 52, the rivet terminals 21a and 22a, and the flanges 21b and 22b at the other side, thereby stabilizing a connection structure thereof.

An upper insulating member 41 (e.g., an upper insulating member 41 at a negative electrode terminal 21 side) electrically insulates the negative electrode terminal 21 and the cap plate 20.

The upper insulating member 41 is interposed between the negative electrode terminal 21 and the cap plate 20 and surrounds the rivet terminal 21a (e.g., the rivet terminal 21a effectively penetrates through the upper insulating member 41). Therefore, by caulking an upper end portion by coupling the upper insulating member 41 to an upper end portion of the rivet terminal 21a, the upper insulating member 41 may be coupled to an upper end portion of the rivet terminal 21a.

A top plate 42 (e.g., a top plate 42 at a positive electrode terminal 22 side) is formed with a conductive member and is installed between the positive electrode terminal 22 and the cap plate 20 to electrically connect the cap plate 20. That is, the cap plate 20 is electrically connected to the electrode assembly 10 through the positive electrode terminal 22.

For example, the top plate 42 is interposed between the positive electrode terminal 22 and the cap plate 20 and surrounds the rivet terminal 22a (e.g., the rivet terminal 22a effectively penetrates through the top plate 42). Therefore, by caulking an upper end portion by coupling the top plate 42 to the upper end portion of the rivet terminal 22a, the top plate 42 is coupled to the upper end portion of the rivet terminal 22a.

Figure 9:
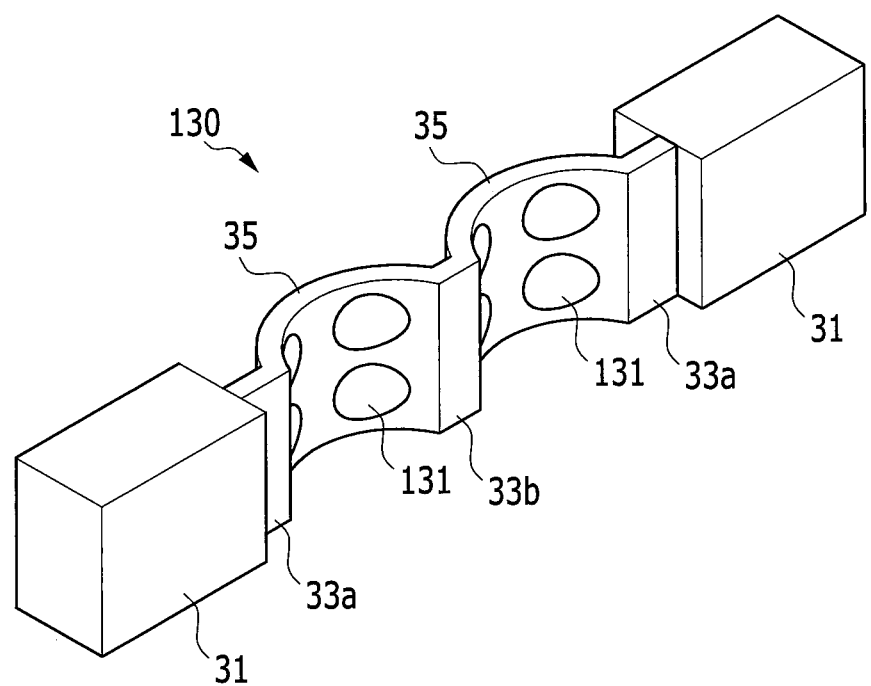
FIG. 9 is a partial perspective view of a vent module according to one or more exemplary embodiments of the present invention.

FIG. 9 is a partial perspective view of a vent module according to one or more exemplary embodiments of the present invention. The same reference numerals used in FIGS. 1 to 8 indicate like elements with the same or similar functions. As such, a detailed description of like elements is omitted.

As shown in FIG. 9, a recess portion 131 may be formed at a surface of the buffer portion 35 of a vent module 130 of a rechargeable battery according to one or more exemplary embodiments of the present invention.

The recess portion 131 may be formed at a surface of the buffer portion 35. As such, during a process of discharging an internal pressure of the rechargeable battery, the internal pressure is distributed on a relatively larger surface area of the buffer portion 35.

Therefore, when an internal pressure of the rechargeable battery exceeds a predetermined pressure, the pressure is distributed across a larger surface area of the buffer portion 35, and the fracture portion 33 that is connected to the buffer portion 35 can fracture in a smooth or relatively smooth manner.

Therefore, when an internal pressure of the rechargeable battery exceeds a predetermined pressure, an opening operation of the vent hole 24 is stably or substantially stably performed and thus damage such as explosion of the rechargeable battery can be prevented or substantially prevented from occurring.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SOME OF THE SYMBOLS OF EXEMPLARY EMBODIMENTS

10 . . . electrode assembly
11 . . . negative electrode
11b . . . uncoated region
12 . . . positive electrode
12b . . . uncoated region
15 . . . case
20 . . . cap plate
21 . . . negative electrode terminal 22 . . . positive electrode terminal
21a, 22a . . . rivet terminal
24 . . . vent hole
25 . . . vent plate
27 . . . seal stopper
29 . . . electrolyte injection opening
30 . . . vent module
31 . . . fixing portion
33 . . . fracture portion
33a . . . first notch groove
33b . . . second notch groove

35 . . . buffer portion
37 . . . vent portion
51 . . . negative electrode current collecting tab
52 . . . positive electrode current collecting tab
53, 54 . . . lower insulating member

What is claimed is:

1. A rechargeable battery, comprising:
   an electrode assembly having a first electrode and a second electrode;
   an electrode terminal electrically connected to the electrode assembly;
   a case that receives the electrode assembly;
   a cap plate at an opening of the case, the cap plate closing and sealing the case and having a vent hole configured to discharge an internal pressure of the case; and
   a vent module comprising:
      a vent portion comprising:
         a buffer portion configured to buffer an impact that is transferred to the vent hole; and
         two or more fracture portions that close and seal the vent hole, each fracture portion having a thickness that is less than a thickness of the buffer portion, wherein the fracture portion is configured to be fractured by the internal pressure; and
      a fixing portion fixed at an inner wall surface of the vent hole, and connected to the vent portion,
   wherein ones of the fracture portions and the buffer portion alternate with each other,
   wherein the buffer portion protrudes in a round shape between the fracture portions, and
   wherein the thickness of the buffer portion is less than a thickness of the fixing portion.

2. The rechargeable battery of claim 1, wherein the inner wall surface of the vent hole has an Insertion groove that receives the fixing portion.

3. The rechargeable battery of claim 2, wherein the fixing portion is welded to the vent hole.

4. The rechargeable battery of claim 1, wherein one of the fracture portion located at or below a center region of the fixing portion.

* * * * *